Feb. 7, 1939.    E. C. HORTON    2,146,396
WINDSHIELD CLEANER
Filed June 3, 1937
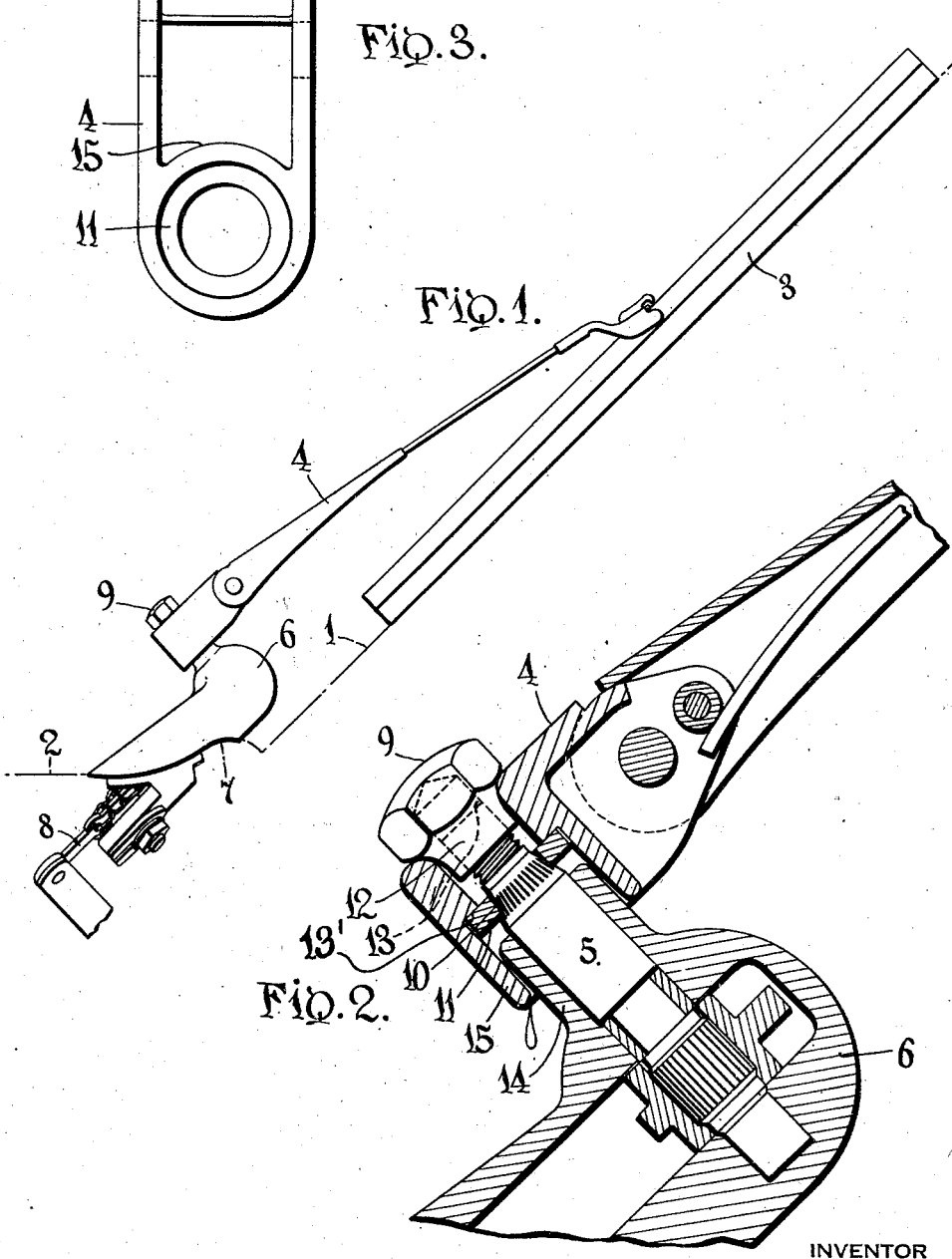

Patented Feb. 7, 1939

2,146,396

UNITED STATES PATENT OFFICE 2,146,396

WINDSHIELD CLEANER

Erwin C. Horton, Hamburg, N. Y., assignor to Trico Products Corporation, Buffalo, N. Y.

Application June 3, 1937, Serial No. 146,223

4 Claims. (Cl. 15—250)

This invention relates to a motor vehicle and particularly to the built in windshield cleaner construction thereof.

In the installation of the wiper shaft on the motor vehicle considerable attention has been given to the weatherproofing of the same so as to avoid leakage of moisture to the interior of the vehicle. Especially is this a problem in the mounting of the windshield cleaner on the cowl owing to the fact that the rain will drive up against the windshield and collect about the wiper mounting. Special precaution must be taken to avoid leakage in connection with the mounting of the wiper shaft, since if a packing gland is used care must be given to avoid increasing the burden on the light windshield cleaner motor and a consequential retardation in the action of the wiper. Furthermore, the seal afforded by the gland packing soon becomes worn and needs tightening adjustment or possible replacement.

The object of the present invention is to improve the built in wiper construction so as to effectively seal the transmission of the power to the wiper from within the car against the leakage of moisture to the interior of the vehicle and without subjecting the windshield cleaner mechanism to any additional load or burden.

In the drawing:

Fig. 1 is a diagrammatic illustration of a motor vehicle equipped with a windshield cleaner embodying the present invention;

Fig. 2 is an enlarged sectional view through a part of the windshield cleaner clearly depicting the invention; and Fig. 3 is a rear view of the shaft end of the wiper arm.

Referring more particularly to the drawing, the numeral 1 designates a window or windshield and 2 the forwardly extending cowl portion thereof, the windshield being depicted as of the sloping type, slanting rearwardly in an upward direction from the cowl. The wiper 3 is actuated over the window glass by an arm 4 which is connected to an actuating shaft 5 journaled in a supporting housing 6. The housing is mounted in a weatherproof manner over an opening 7 in the cowl 2 and extends therethrough to provide proper support for the power transmitting parts, generally indicated at 8. The housing 6 supports the shaft at a normal to the window 1 and with the shaft extending forwardly from the housing 6 it is thereby disposed at an incline with the outer arm carrying end thereof elevated. The outer or forward end of the shaft passes through an opening 13 in the arm and is depicted as being threaded to receive a cap nut 9 by which the arm is operatively clamped to the shaft 5, the latter being preferably formed with a knurled shoulder 10 against which a shoulder ring or piece 11 is forced by the nut, such shoulder piece tightly fitting within a counterbored portion of the arm opening and resting on the seat 13'. The nut is formed with a reduced tapered extension 12 that fits in the outer end of the opening 13 so as to give the arm rigid support on the shaft and also to close the opening to the weather.

The housing 6 completely encloses the shaft except for the projecting forward end thereof and to seal this against weather exposure the housing is formed with a sleeve 14 extending axially of and about the shaft. The arm has its shaft engaging end formed with a sleeve or skirt 15 which completely encloses and freely telescopes the sleeve 13 in a rearward direction for a sufficient distance so that the proper extent of overlap in the sleeve portions 14 and 15 is afforded. Since the sleeve portions are on an inclined axis the seepage of moisture therebetween and along the shaft 5 is prevented. The driving rain is deflected from the shaft by the downwardly discharging exterior sleeve 15.

With the shaft extending forwardly the sleeve portion 15 together with the cap nut 9 fully encloses and protects the end of the shaft which protrudes forwardly from the sleeve portion 14. The overlap between the sleeve portions being in a rearward direction the driving rain will pass from the outer sleeve portion 15 back over the housing without any seepage in a reverse direction within the outer sleeve portion 15. The telescopic fit between the weatherproofing sleeve portions 14 and 15 will have sufficient clearance to avoid friction between the telescoping surfaces and, further, will readily permit placement and replacement of the arm 4 on the shaft, as occasion may arise. Any moisture collecting about the lower end of the outer sleeve will form a film between the sleeves to seal the clearance against splashing rain entering. By the provision of the telescoping sleeve portions the shaft is free to rotate without any drag being placed on the cleaner drive, and the transmission of power to the exterior of the vehicle is accomplished effectively in a practical weatherproof manner.

The foregoing description has been given for clearness of understanding only, since the invention is obviously capable of other physical embodiments without departing from the spirit or scope of the invention as hereafter claimed.

What is claimed is:

1. In a windshield cleaner mounting for a motor vehicle body having a slanting windshield, a weatherproof bearing support mountable on the vehicle body for communication with the interior thereof, an inclined driven shaft rotatable in the bearing support and extending forwardly therefrom substantially normal to the slanting windshield, said support having a forwardly and upwardly extending sleeve completely surrounding the shaft, and a wiper arm fixed to the forward end of the shaft adjacent said sleeve and having a skirt freely extending downwardly and rearwardly in completely encircling unsupported relation with the sleeve to deflect moisture downwardly away from the sleeve and thereby protect the latter and the bearing support from such moisture.

2. In a windshield cleaner mounting for a motor vehicle body having a slanting windshield, a weatherproof bearing support mountable on the vehicle body for communication with the interior of the latter and sealable against leakage of moisture around the support into the vehicle body interior, a driven shaft rotatable in the bearing support and extending forwardly and upwardly therefrom substantially normal to the slanting windshield, said support having a forwardly and upwardly extending sleeve completely surrounding the shaft, and a wiper arm fixed to the forward end of the shaft adjacent the sleeve and having a rearwardly and downwardly opening skirt disposed in substantially telescoped relation about the sleeve, said skirt terminating short of the body of the bearing support to space the water shedding end of the skirt away from the body of the support, the outer surface of the sleeve and the inner surface of the skirt loosely interfitting and extending rearwardly and downwardly toward the lower opening of the skirt for shedding moisture downwardly against moisture backing up between the sleeve and skirt surfaces.

3. A wiper arm for association with a sleeve extending about a shaft from a supporting housing, comprising a body having a shaft receiving opening therein with an annular weather skirt entirely thereabout for freely receiving the sleeve, said skirt being continuous and uninterrupted throughout the dimension of the arm lengthwise of the shaft to shield the latter from the weather, the shaft receiving opening being closed at its outer end to the weather whereby the skirt when associated with the sleeve will enclose the shaft against the weather.

4. In a wiper arm mounting for windshield cleaners, a driven shaft, a supporting housing rotatably carrying the shaft and having a bearing sleeve extending forwardly therefrom and carrying the shaft therein with the forward end of the shaft protruding from the sleeve, an arm fixed on the protruding end of the shaft and having a hooding skirt extending along and receiving in overlapping relation the forward end portion of the bearing sleeve to divert moisture therefrom.

ERWIN C. HORTON.